Jan. 15, 1924.
E. E. SWITZER
HYDRAULIC PACKING
Filed Jan. 31, 1922
1,481,160
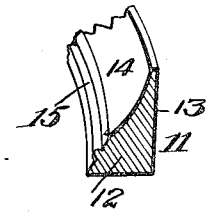
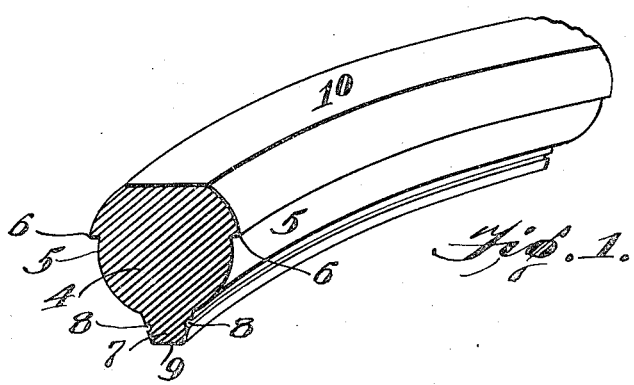
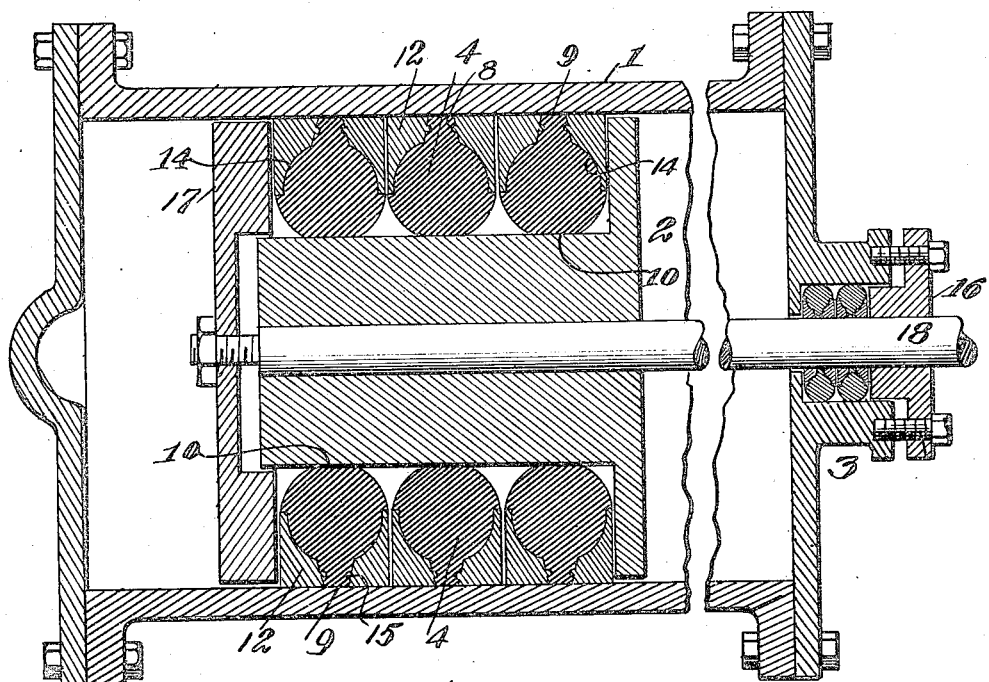

Patented Jan. 15, 1924.

1,481,160

UNITED STATES PATENT OFFICE.

ELMER E. SWITZER, OF BEAUMONT, TEXAS, ASSIGNOR, BY DIRECT AND MESNE ASSIGNMENTS, TO SWITZER PACKING COMPANY, OF BEAUMONT, TEXAS, A CORPORATION OF TEXAS.

HYDRAULIC PACKING.

Application filed January 31, 1922. Serial No. 533,094.

*To all whom it may concern:*

Be it known that I, ELMER E. SWITZER, a citizen of the United States, residing at Beaumont, in the county of Jefferson and State of Texas, have invented certain new and useful Improvements in Hydraulic Packings, of which the following is a specification, reference being had therein to the accompanying drawings.

This invention relates to a hydraulic packing, and has for its object the construction of a comparatively simple yet efficient packing which may be used in the gland device of a pump or may be used equally as well in direct connection with the plunger of a pump.

With this and other objects in view, my invention comprises certain novel combinations, constructions and arrangements of parts as will be hereinafter described, illustrated in the accompanying drawings, and more particularly pointed out in the appended claim.

In the drawings:

Figure 1 is a fragmentary, perspective view of a packing constructed in accordance with the present invention, partly shown in section.

Figure 2 is a longitudinal, sectional view of a portion of a pump showing my packing in position thereon.

Figure 3 is a fragmentary, perspective view of my metal packing ring.

Referring to the drawings by numerals, 1 designates the pump casing, and 2 is the plunger therein. The gland device 3 is formed at one end of the pump casing 1.

My packing comprises a rubber body 4 provided with curved side-faces 5, and with overhanging flanges 6 overhanging the side-faces 5 (Fig. 1). An integral, projecting flange 7 is formed on the body 4 and in the sides of flange 7 are formed longitudinally-extending side grooves 8. On flange 7 is formed a flat bearing edge 9, and body 4 is provided with a flat bearing edge 10; it will, therefore, be seen that my packing has two flat bearing edges 9 and 10; the packing may be formed in sections, but as each section is a duplicate of the structure shown in Fig. 1, it is not necessary to show a plurality of sections in the drawings.

In placing my packing upon the hydraulic pump (or other mechanism), Fig. 2, I use metal packing rings 11 against the packing, and each packing ring comprises a body 12 having a straight, outer face 13 and a curved, inner face 14. On the curved, inner face 14 is a rounded, longitudinally-extending bead 15 that fits into the side groove 8 of the packing. This bead 15, on the ring 11, forms a seal, as well as a protection for the rubber; it also forms a slight wiper on the plunger, which is essential for heavy work. The beads 15, of the rings 11, readily enter the grooves 8 when the plate 16 of gland device 3 or plate 17 are compressed or tightened in position.

The packings shown in the gland device 3 are positioned so that the flat bearing edge 9 engages the rod 18, but in the arrangement of the packing on the plunger 2, the flat bearing edge 9 engages the inner face of the pump casing; however, the essential features of the packing are the same, irrespective as to the manner of placing the packings in place upon different machinery, or in different positions or places.

My hydraulic packing is especially adapted in inside and outside packed plunger pumps; it has already been found to hold sixteen hundred pounds of cold water; hot water at 380 degrees; hot oil at from 500 to 700 degrees.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

A packing of the class described comprising a body provided with an integral, projecting flange, said body and flange provided with flat bearing edges, said body between said edges provided on opposite sides with outwardly extending flanges from the body, and said projecting flange provided on its sides with longitudinally-extending grooves.

In testimony whereof I hereunto affix my signature.

ELMER E. SWITZER.